United States Patent
Roumens

(10) Patent No.: US 11,163,380 B2
(45) Date of Patent: Nov. 2, 2021

(54) METHOD FOR CONTROLLING A PORTABLE OBJECT AND PORTABLE OBJECT CONTROLLED BY SUCH A METHOD

(71) Applicant: SAS JOYEUSE, Paris (FR)

(72) Inventor: Mathieu Roumens, Paris (FR)

(73) Assignee: SAS JOYEUSE, Paris (FR)

( * ) Notice: Subject to any disclaimer, the term of this patent is extended or adjusted under 35 U.S.C. 154(b) by 0 days.

(21) Appl. No.: 16/763,165

(22) PCT Filed: Nov. 8, 2018

(86) PCT No.: PCT/EP2018/080645
§ 371 (c)(1),
(2) Date: May 11, 2020

(87) PCT Pub. No.: WO2019/092120
PCT Pub. Date: May 16, 2019

(65) Prior Publication Data
US 2020/0379580 A1    Dec. 3, 2020

(30) Foreign Application Priority Data
Nov. 13, 2017  (FR) ........................ 1760665

(51) Int. Cl.
*G06F 3/0346*   (2013.01)
*G06F 1/3215*   (2019.01)
*G06F 3/01*    (2006.01)

(52) U.S. Cl.
CPC .......... *G06F 3/0346* (2013.01); *G06F 1/3215* (2013.01); *G06F 3/017* (2013.01)

(58) Field of Classification Search
CPC ...... G06F 3/0346; G06F 3/017; G06F 1/3215; G06F 1/3287; Y02D 10/00; H04N 21/42222
See application file for complete search history.

(56) References Cited

U.S. PATENT DOCUMENTS 3,959,893 A * 6/1976 Sigg ................. G09B 19/02
                                                434/208
4,452,588 A * 6/1984 Smith ............... G09B 19/02
                                                273/146

(Continued)

FOREIGN PATENT DOCUMENTS

| GB | 2533389 | 6/2016 |
| WO | 2007012987 | 2/2007 |
| WO | 2009018988 | 2/2009 |

OTHER PUBLICATIONS

French Search Report and Written Opinion from the corresponding French Patent Application No. 1760665, dated Jul. 10, 2018.

(Continued)

*Primary Examiner* — Grant Sitta
(74) *Attorney, Agent, or Firm* — Greer, Burns & Crain, Ltd

(57) ABSTRACT

A method for controlling a portable object, including increasing the strength of a signal emitted by the object in response to a clockwise, or respectively anti-clockwise, rotation of the object in relation to a first axis of rotation passing through the object, and reducing the strength of a signal emitted by the object in response to an anti-clockwise, or respectively clockwise, rotation of the object in relation to the first axis of rotation.

20 Claims, 2 Drawing Sheets

(56) References Cited

U.S. PATENT DOCUMENTS

| | | | | |
|---|---|---|---|---|
| 6,271,453 B1* | 8/2001 | Hacker | G09B 15/003 | 434/171 |
| 6,366,758 B1* | 4/2002 | Dunn | G09B 1/00 | 434/319 |
| 6,659,774 B1* | 12/2003 | Ramos | G09B 1/02 | 273/146 |
| 7,011,525 B2* | 3/2006 | Mejia | G09B 19/04 | 434/167 |
| 7,614,881 B2* | 11/2009 | Bagues | G09B 19/02 | 434/188 |
| 7,956,271 B1* | 6/2011 | Jonas | G09B 1/38 | 84/476 |
| 8,202,099 B2* | 6/2012 | Lancaster | G09B 17/00 | 434/403 |
| 9,545,542 B2* | 1/2017 | Binder | G08B 5/36 | |
| 9,793,869 B1* | 10/2017 | Snyder | H04R 1/04 | |
| 2003/0148700 A1* | 8/2003 | Arlinsky | G09B 1/40 | 446/91 |
| 2006/0172787 A1* | 8/2006 | Ellis | G06N 3/004 | 463/1 |
| 2007/0257885 A1 | 11/2007 | Liberty | | |
| 2009/0146803 A1* | 6/2009 | Sellen | G08B 1/08 | 340/539.1 |
| 2009/0256780 A1* | 10/2009 | Small | H04N 1/00458 | 345/55 |
| 2009/0273560 A1* | 11/2009 | Kalanithi | G06F 3/017 | 345/156 |
| 2011/0084900 A1* | 4/2011 | Jacobsen | G06F 3/017 | 345/156 |
| 2011/0298689 A1* | 12/2011 | Bhömer | G06F 3/1431 | 345/1.1 |
| 2012/0056810 A1* | 3/2012 | Skulina | G06F 3/0338 | 345/161 |
| 2012/0302128 A1* | 11/2012 | McClintock | A63H 11/02 | 446/431 |
| 2012/0302303 A1* | 11/2012 | Rosendo | A63F 9/0842 | 463/9 |
| 2013/0165014 A1 | 6/2013 | Yang | | |
| 2013/0167290 A1* | 7/2013 | Ben Ezra | A42B 3/046 | 2/425 |
| 2013/0302763 A1* | 11/2013 | Edwards | G09B 5/02 | 434/159 |
| 2014/0210748 A1* | 7/2014 | Narita | G06F 3/0488 | 345/173 |
| 2014/0213140 A1* | 7/2014 | Goh | A63H 3/28 | 446/175 |
| 2015/0304772 A1* | 10/2015 | Risberg | H04R 3/007 | 381/55 |
| 2016/0062480 A1* | 3/2016 | Ogawa | G06F 3/044 | 345/156 |
| 2016/0170556 A1* | 6/2016 | Taki | G06F 3/0416 | 345/173 |
| 2016/0195925 A1* | 7/2016 | Nguyen | G06F 3/0346 | 345/156 |
| 2016/0239182 A1* | 8/2016 | Eronen | G06F 3/017 | |
| 2017/0092249 A1* | 3/2017 | Skulina | G01L 5/223 | |
| 2018/0188831 A1* | 7/2018 | Lyons | G06F 3/0304 | |
| 2019/0104365 A1* | 4/2019 | Hanes | G06F 3/017 | |

OTHER PUBLICATIONS

International Search Report and Written Opinion from the corresponding International Patent Application No. PCT/EP2008/006407, dated Dec. 17, 2008.

* cited by examiner

METHOD FOR CONTROLLING A PORTABLE OBJECT AND PORTABLE OBJECT CONTROLLED BY SUCH A METHOD

BACKGROUND

The present invention relates to the field of control methods and systems and methods and systems for controlling electronic devices.

The present invention relates in particular to a method for controlling a portable object and a portable object controlled by such a method. The invention relates in particular to the control of a portable multimedia object.

Control methods based on manipulating buttons, levers and wheels situated on an outer surface of an electronic object are known in the state of the prior art. This manipulation brings about the activation, deactivation or modification of a function implemented by the electronic object in question. This type of control requires the design and the ergonomics of the electronic object to be adapted as a function of the buttons and/or wheels to be integrated on the outer surface of the object.

Methods for tactile control of an electronic object based on a user applying a localized mechanical contact with a predetermined area of a sensitive surface of the electronic object are also known in the state of the prior art. These sensitive surfaces contain "tactile sensors", usually capacitive, the price of which is high and which mainly operate only on contact with fingers. These tactile surfaces situated on the outer surface of the object are sensitive, among other things, to impacts, liquids and humidity, and yet they are exposed to them.

One of the major drawbacks of the abovementioned control methods is linked to the fact that manipulation of these controls is not suited to children, whose fine motor skills are not sufficiently developed, or to people with a visual impairment, or to the elderly, disabled people or those with motor or neurodegenerative disorders.

Voice control methods are known in the state of the prior art more recently, aiming to bring about an activation, deactivation or modification of a function implemented by the electronic object in response to a voice command issued by a user. However, such methods are not suited to use in noisy environments, in particular for domestic applications or in the presence of music or background noise. In addition, the activation of such controls is not accessible either to children, who do not have sufficient language skills, or to people who are hard of hearing.

Methods for controlling a smart object implemented by means of an interface of a remote object, such as a smartphone for example, are also known in the state of the art. This type of method has the drawback of requiring an application dedicated to the smart object to be installed on one's smartphone and of increasing the time and attention given to one's smartphone.

A drawback that is common to the existing control methods and devices resides in the fact that the electronic objects to be controlled must be equipped with areas and/or buttons to be inserted on the outer surface of the object.

An aim of the invention is to propose a control method and a portable object controlled by such a method:
  at least partially overcoming the drawbacks of the abovementioned control methods, and/or
  making more use of the gross motor skills than of the fine motor skills of the user, and/or
  simplifying the control of portable objects and making it more intuitive, and/or
  not requiring the use of any control buttons on the outer surface of the portable object, and/or
  differing from existing methods and making it possible for any type of population to use the portable object controlled by such a method, for example very young children, the elderly and disabled people or those with motor or neurodegenerative disorders.

SUMMARY

To this end, according to a first aspect of the invention, a method for controlling a portable object is proposed, comprising:
  increasing the strength of a signal emitted by the object in response to a clockwise, or respectively anti-clockwise, rotation of the object with respect to a first axis of rotation passing through the object,
  reducing the strength of a signal emitted by the object in response to an anti-clockwise, or respectively clockwise, rotation of the object with respect to the first axis of rotation.

The term "axis of rotation passing through the object" is understood to mean an axis of rotation at least part of which is incorporated in the object, or an axis of rotation passing through at least a part of the object.

A signal can be composed of a set of signals emitted by the cube.

The portable object can comprise one or more faces.

The portable object can be a facetted portable multimedia object.

The portable object can be a polyhedron.

The portable object can be a cube.

The level of increase or decrease of the strength of a signal emitted by the object can be incremented for each rotation of the object by an angle of 5° with respect to the first axis of rotation.

The signal emitted by the object can be:
  a sound signal, or
  an optical signal, or
  a vibration signal, or
  an olfactory signal, or
  a radio signal.

By "vibration signal" is meant a signal emitted by a vibrating device and/or a device arranged to emit vibrations.

Method according to the invention in which passage of the object from a standby state to an activated state can be initiated in response to:
  a rotation of the object by an angle greater than or equal to a first minimum angle value with respect to an axis of rotation passing through the object, and/or
  agitation of the object.

The axis of rotation passing though the object can be perpendicular to at least one face of the object.

The first minimum angle value can be greater than or equal to 360°.

The first minimum angle value can be greater than or equal to 450°.

Preferably, when the rotation of the object with respect to the axis of rotation passing through the object is stopped for a period of time greater than a second minimum duration, the angle of rotation of the object taken into account for initiating passage of the object from a standby state to an activated state is reset.

The second minimum duration can be greater than or equal to 2 seconds.

The direction of rotation of the object with respect to the axis of rotation passing through the object, initiating passage of the object from a standby state to an activated state, can be clockwise or anti-clockwise.

By "agitation of the object" is meant a shaking of the object.

By "agitation of the object" can be meant a shaking of the object in a back and forth motion.

The agitation can be carried out in a vertical or horizontal movement.

A trajectory of agitation of the object can comprise a translational component and a rotational component.

The rotational component of the trajectory of agitation of the object is associated with a rotational movement of the object with respect to an axis of rotation having no section in common with the object.

Method according to the invention in which passage of the object from an activated state to a standby state can be initiated in response to a rotation of the object by an angle greater than or equal to a second minimum angle value with respect to a second axis of rotation passing through the object.

The second minimum angle value can be greater than or equal to 360°.

The second minimum angle value can be greater than or equal to 450°.

Preferably, when the rotation of the object with respect to the axis of rotation passing through the object is stopped for a period of time greater than the second minimum duration, the angle of rotation of the object taken into account for initiating passage of the object from an activated state to a standby state is reset.

The second minimum duration can be greater than or equal to 2 seconds.

The direction of rotation of the object with respect to the axis of rotation passing through the object, initiating passage of the object from a standby state to an activated state, can be clockwise or anti-clockwise.

Method according to the invention in which reading of an item of media content by the object can be initiated in response to an agitation of the object, the item of media content read being associated with a face of the object oriented upwards.

An item of media content can be any type of digital file.

An item of media content can be a radio frequency.

An item of media content can be, among other things, an audio and/or video track.

The item of media content read is associated with a face of the object oriented upwards when the agitation is initiated.

The face of the object oriented upwards during the agitation is held upwards for the entire duration of the agitation.

The item of media content can comprise a set of items of content: in this case, after the reading has been initiated, the items of media content are read successively or randomly.

Several items of content can be read simultaneously.

Method according to the invention in which an item of media content being read can be indexed in a dedicated folder in response to a displacement of the object according to a particular predefined trajectory.

The particular predefined trajectory corresponds to a displacement of the object in two or more directions in space, the directions being clearly different.

Preferably, the trajectory is comprised in one plane.

The particular predefined trajectory can be for example a geometric shape.

The particular predefined trajectory can be for example a heart shape.

The item or items of media content stored in the dedicated folder can be associated with one of the faces of the object.

Method in which a new item of media content can be read in response to a rotation of the object by an angle greater than a third minimum angle value with respect to a third axis of rotation passing through the object, said rotation being followed, in a period of time shorter than or equal to a first maximum duration, by a return of the object to its initial position, the new item of media content follows the item of media content being read within a list of items of media content; said list of items of media content being associated with the face of the object oriented upwards when the object is in its initial position.

When the rotation of the object with respect to the third axis of rotation passing through the object is carried out in the clockwise direction, the new item of media content follows the item of media content being read within the list of items of media content. When the rotation of the object with respect to the third axis of rotation passing through the object is carried out in the anti-clockwise direction, the new item of media content precedes the item of media content being read within the list of items of media content.

The third minimum angle value can be greater than 10°.

The first maximum duration can be less than or equal to 2 seconds.

The items of media content in the list can be listed in order.

A list of items of media content can comprise:
a set of digital files, or
a set of audio and/or video tracks, or
a set of radio frequencies.

The reading of the items of media content can be implemented according to the list of items of content or randomly.

Method according to the invention able to comprise fast forwarding to the end of an item of content being read, and rewinding to the beginning of the item of content being read in response to a rotation of the object by an angle greater than a fourth minimum angle value with respect to a fourth axis of rotation passing through the object, the fast forwarding and rewinding being triggered when the angle is held for a duration greater than a first minimum duration and continued while the angle is held, the direction of rotation for rewinding being opposite to that for fast forwarding.

The fourth minimum angle value can be greater than 10°.

The first minimum duration can be greater than 2 seconds.

Method according to the invention in which the face of the object oriented upwards can be parallel to a horizontal plane, the first axis of rotation being able to be perpendicular to said face oriented upwards, the second axis of rotation being able to be identical to the first axis of rotation, and the fourth axis of rotation can be identical to the third axis of rotation, perpendicular to the first axis of rotation and oriented in a predefined direction with respect to the face of the object oriented upwards.

The third and/or fourth axis of rotation are oriented with respect to the face of the object oriented upwards.

Method in which the reading of the item of content can be suspended in response to two successive displacements of the object separated by a period of time shorter than a second maximum duration; the distance travelled during each displacement being shorter than a first maximum distance and the duration of each of the successive displacements being shorter than a third maximum duration.

The second maximum duration can be less than 2 seconds.

The third maximum duration can be less than 1 second.

The first maximum distance can be less than 2 centimetres.

Preferably, the first maximum distance is less than 1 centimetre.

More preferably, the first maximum distance is less than 0.5 centimetres.

Each of the successive displacements of the object can be brought about by a blow given on the object.

Each of the successive displacements of the object can be brought about by a tap given on the object.

Method according to the invention in which the track being read can be read again from the beginning in response to three successive displacements of the object separated by a period of time shorter than a fourth maximum duration; the distance travelled during each displacement being shorter than a second maximum distance and the duration of each of the successive displacements being shorter than the third maximum duration.

The fourth maximum duration can be less than 2 seconds.

The fourth maximum duration can be equal to the second maximum duration.

The second maximum distance can be less than 2 centimetres, preferably less than 1 centimetre, more preferably less than 0.5 centimetres.

The second maximum distance can be equal to the first maximum distance.

Method according to the invention in which, when the track being read has been read for a period of time shorter than a fifth maximum duration, reading of a track from an archive comprising files read during a session can be initiated in response to three successive displacements of the object, these successive displacements being separated by a period of time shorter than the second maximum duration; the distance travelled during each displacement being shorter than the second maximum distance and the duration of each of the successive displacements being shorter than the third maximum duration.

The fifth maximum duration can be less than 3 seconds.

According to a second aspect of the invention, a portable object comprising one or more faces is proposed, said object comprising:
  an energy storage unit,
  a module for detecting displacements of the object comprising an accelerometer and a gyrometer,
  a loud-speaker and/or a screen and/or a vibration source, and
  a processing unit configured and/or programmed to:
  increase the strength of a signal emitted by the object in response to the detection, by the detection module, of a clockwise, or respectively anti-clockwise, rotation of the object with respect to a first axis of rotation passing through the object,
  reduce the strength of a signal emitted by the object in response to the detection, by the detection module, of an anti-clockwise, or respectively clockwise, rotation of the object with respect to the first axis of rotation.

The accelerometer and the gyrometer can form a single sensor.

The detection module can comprise a compass.

The object can be arranged to emit several different signals simultaneously or successively.

The accelerometer, the compass and the gyrometer can form a single sensor.

The screen can be comprised on one face of the object.

The object can, for example, be a lamp.

The object can, for example, be a speaker.

The object can, for example, be a remote control.

The processing unit can be configured and/or programmed to implement the method according to the first aspect of the invention.

Object according to the invention in which the processing unit can be configured and/or programmed to read an item of media content in response to the detection, by the detection module, of an agitation of the object, the item of media content read being associated with a face of the object oriented upwards.

An item of media content can be any type of digital file.

An item of media content can be a radio frequency.

An item of media content can be, among other things, an audio and/or video track.

The item of media content read is associated with a face of the object oriented upwards when the agitation is initiated.

The face of the object oriented upwards during the agitation is held upwards for the entire duration of the agitation.

The media content can comprise a set of items of content: in this case, after the reading has been initiated, the items of media content are read successively or randomly.

Object according to the invention in which the face of the object oriented upwards can be parallel to a horizontal plane, and in that the first axis of rotation can be perpendicular to said face oriented upwards.

Object according to the invention in which the portable object can be a facetted portable multimedia object.

Object according to the invention in which the object can be a polyhedron.

Object according to the invention in which the object can be a cube.

Object according to the invention able to comprise:
  a transceiver arranged to be connected to a remote emitter of an external device,
  an electronic memory;
  the processing unit being configured and/or programmed to read items of media content from data emitted by the remote emitter and/or from the electronic memory.

BRIEF DESCRIPTION OF THE DRAWINGS

Other advantages and characteristics of the invention will become apparent on reading of the detailed description of implementations and embodiments which are in no way limitative, and the following attached drawings.

DETAILED DESCRIPTION

As the embodiments described herein are in no way limitative, variants of the invention can be considered in particular comprising only a selection of the characteristics described, in isolation from the other characteristics described (even if this selection is isolated within a phrase containing these other characteristics), if this selection of characteristics is sufficient to confer a technical advantage or to differentiate the invention with respect to the state of the prior art. This selection comprises at least one, preferably functional, characteristic without structural details, or with only a part of the structural details if this part alone is sufficient to confer a technical advantage or to differentiate the invention with respect to the state of the prior art.

Figure 1:
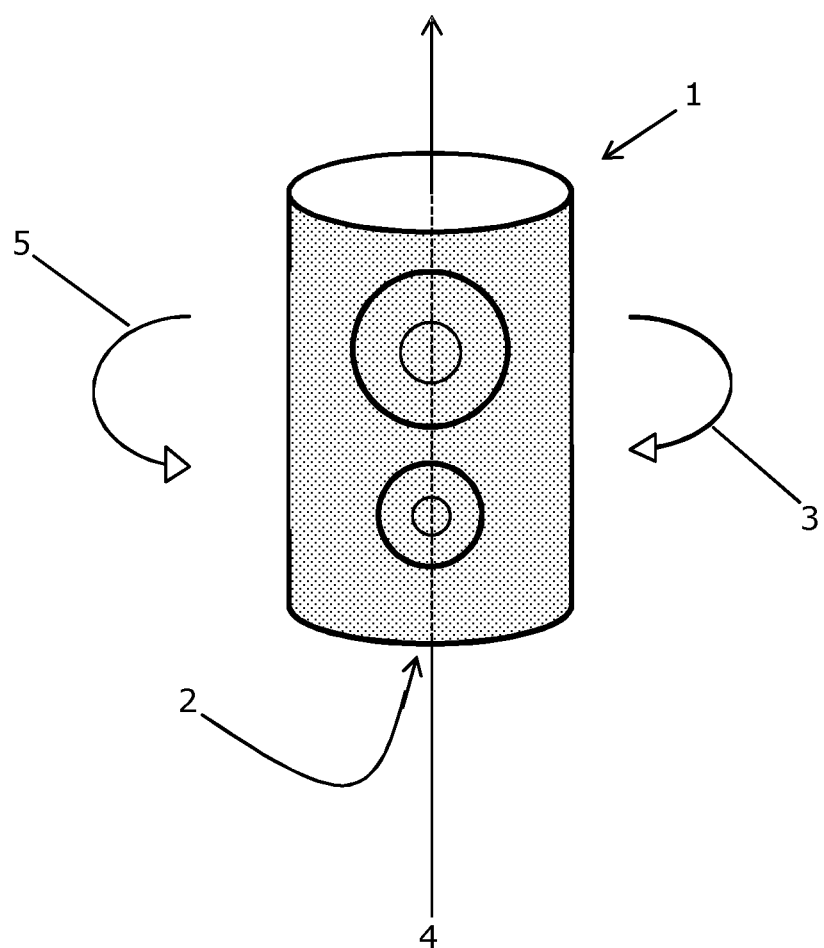
FIG. 1 is a diagrammatic side-view representation of a portable speaker according to the invention.

With reference to FIG. 1 in a first embodiment a portable speaker 1 comprising a lower face 2 is described. The speaker comprises an energy storage unit, a module for detecting displacements of the speaker 1, a loud-speaker and a processing unit. The processing unit is programmed to increase the strength of a sound volume emitted by the speaker 1 in response to the detection, by the detection module, of a clockwise rotation 5 of the speaker 1 with respect to the first axis of rotation 4 passing through the speaker 1. The processing unit is programmed to reduce the strength of a signal emitted by the cube 1 in response to the detection, by the detection module, of an anti-clockwise rotation 3 of the cube 1 with respect to the first axis of rotation 4 passing through the cube 1 and oriented vertically.

Figure 2:
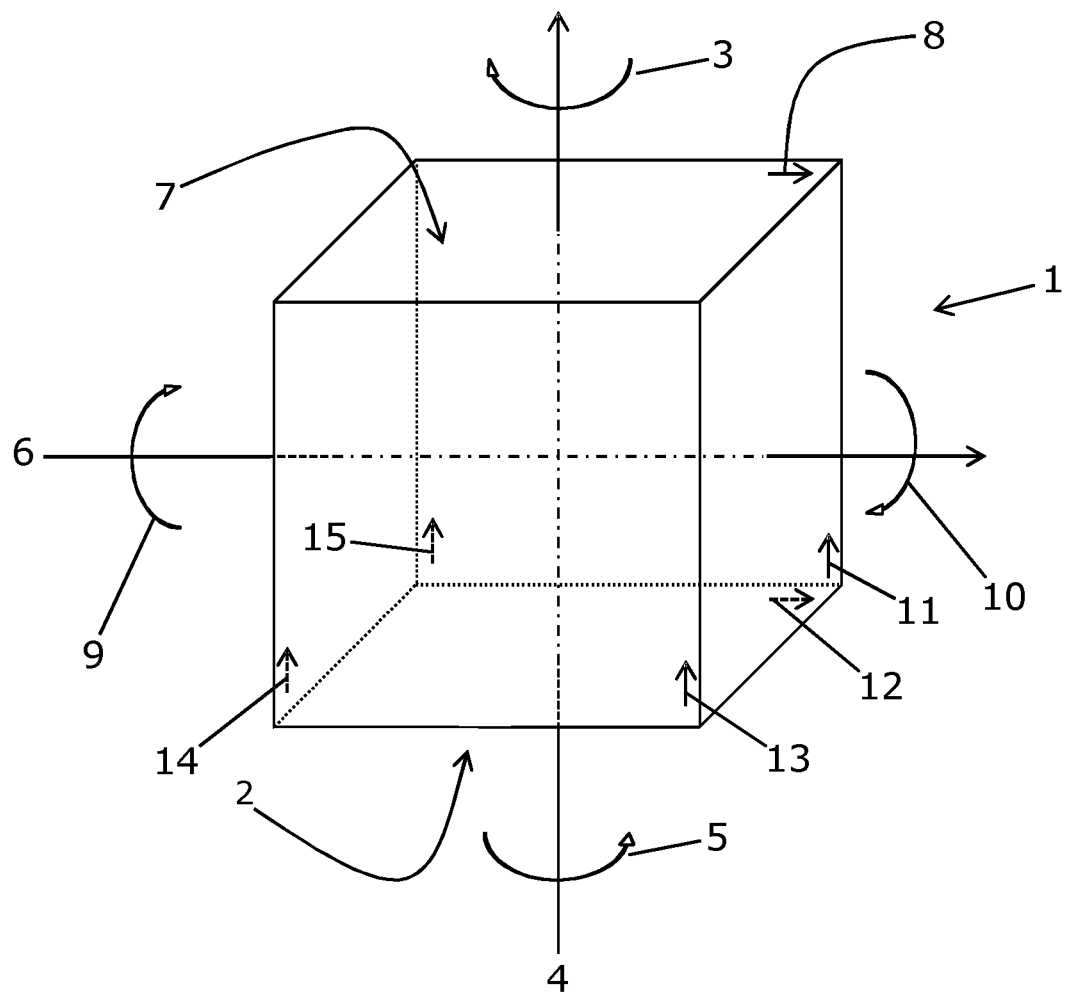
FIG. 2 is a diagrammatic side-view representation of a portable cube according to the invention.

With reference to FIG. 2 in a first embodiment a method for controlling a portable object 1 comprising six faces 2 is described. By way of non-limitative example, the portable object is a portable cube 1 which reads stories and plays music and songs comprising a lower face 2. The method comprises increasing the strength of a signal emitted by the cube 1 in response to a clockwise rotation 5 of the cube 1 with respect to a first axis of rotation 4 passing through the cube 1. By way of non-limitative example, the strength of the signal emitted by the cube 1 is the volume of a sound signal emitted by the cube 1 in response to a clockwise rotation 5 of the cube 1 with respect to the first axis of rotation 4 passing through the cube 1 and oriented vertically. The method also comprises reducing the strength of a volume emitted by the cube 1 in response to an anti-clockwise rotation 3 of the cube 1 with respect to the first axis of rotation 4 passing through the cube 1 and oriented vertically. Each time the cube 1 rotates by an angle of 5°, the strength of the volume emitted increases by one level. The cube 1 comprises nine volume levels.

A sound signal in the form of stories read and music and songs is emitted by the cube 1. The cube 1 also emits radio signals in the ultra high frequency (UHF) and super high frequency (SHF) ranges, in particular according to network protocols of the Wi-Fi or Bluetooth type. The cube 1 also receives radio signals from a remote emitter in the ultra high frequency (UHF) and super high frequency (SHF) ranges, in particular according to network protocols of the Wi-Fi or Bluetooth type.

When the cube 1 is in the standby state, passage of the cube 1 from the standby state to an activated state is initiated in response to a rotation of the cube 1 by an angle greater than or equal to 450° with respect to an axis of rotation passing through the cube 1 and perpendicular to two opposite faces of the cube 1. In this case, when the rotation of the cube 1 is stopped for a period of time greater than or equal to 2 seconds, the angle of rotation of the cube 1 taken into account for initiating passage of the cube 1 from the standby state to the activated state is reset. In other words, when the rotation of the cube 1 is stopped for a period of time greater than or equal to 2 seconds, the angle of rotation of the cube 1 effected before the rotation stopped is not taken into account for measuring the angle initiating passage of the cube 1 from the standby state to the activated state. The direction of rotation of the cube 1 can be clockwise 5 or anti-clockwise 3.

When the cube 1 is in the standby state, passage of the cube 1 from the standby state to an activated state is also initiated in response to an agitation of the cube 1 in a back and forth motion comprising at least three back and forth motions of the cube 1. The agitation is carried out vertically or horizontally. An acceleration value of the cube 1 during back and forth motions should be greater than or equal to 2.8 times the acceleration of gravity (G). No condition is applied with regard to the amplitude of the agitation movement. If the return movements imparted to the cube 1 are stopped for a duration greater than or equal to 2 seconds before three back and forth motions have been given to the cube 1, the number of back and forth motions taken into account for initiating passage of the cube 1 from the standby state to the activated state is reset. In other words, when the back and forth motions imparted to the cube 1 are stopped for a duration greater than or equal to 2 seconds before three back and forth motions have been imparted to the cube 1, the number of back and forth motions carried out before the rotation stopped is not taken into account for counting the number of back and forth motions initiating passage of the cube 1 from the standby state to the activated state.

Passage of the cube 1 from the activated state to the standby state is initiated in response to a rotation of the cube 1 by an angle greater than or equal to 450° with respect to the first axis of rotation 4. When the cube 1 is in an operating state, if the rotation of the cube 1 with respect to the first axis of rotation 4 is stopped for a period of time greater than 2 seconds, the angle of rotation of the cube 1 taken into account for initiating passage of the cube 1 from an activated state to a standby state is reset. In other words, when the rotation of the cube 1 with respect to the first axis of rotation 4 is stopped for a period of time greater than 2 seconds, the angle of rotation of the cube 1 effected before the rotation stopped is not taken into account for measuring the angle initiating passage of the cube 1 from the activated state to the standby state. The direction of rotation of the cube 1 can be clockwise 5 or anti-clockwise 3.

Passage of the cube 1 from the activated state to the standby state is also initiated when the cube 1 is not moved for a duration greater than 5 minutes.

Reading of an item of media content by the cube 1 is initiated in response to an agitation of the cube 1, the item of media content read being associated with a face 7 of the cube 1 oriented upwards during the agitation. The item of media content can be any type of digital file. The item of media content can be a radio frequency or an audio and/or video track.

By way of non-limitative example, the item of media content can be an audio file and in particular a story for children and reading of an audio file, from a list of audio files associated with the face 7 of the cube 1 oriented upwards during the agitation, by the cube 1 is initiated in response to an agitation of the cube 1, the audio file read being associated with a face 7 of the cube 1 oriented upwards during the agitation. The face 7 of the cube 1 oriented upwards during the agitation is held upwards for the entire duration of the agitation. When a reading is initiated, a list of audio files composed of the set of audio files associated with the face 7 of the cube 1 oriented upwards during the agitation is generated according to a random order. The reading of the first track from the list in question is initiated in response to the agitation of the cube 1 and the other tracks from the list are read successively.

The cube 1 can be arranged to read several items of media content simultaneously. By way of non-limitative example, the cube 1 can be arranged to read several types of media content such as a digital file, or a radio frequency, or an audio-visual track. In this case, reading of a particular type of media content by the cube 1 is initiated in response to a particular agitation of the cube 1, for example in a particular direction. In this case, one type of media content is associated with one particular face of the cube 1.

An item of media content being read is indexed in a dedicated folder in response to a displacement of the cube 1 according to a particular predefined trajectory. By way of non-limitative example, the item of media content can for example be an audio reading track or an audio-visual reading track. The dedicated folder is associated with one of the faces of the cube 1. An agitation of the cube 1 when the face with which the audio files stored in the dedicated folder are associated is oriented upwards initiates the reading of the first track from the list of audio files stored in the dedicated folder. Alternatively, agitation of the cube 1 can initiate the reading of the first track from a list of audio files stored in the dedicated folder generated in a random order. The particular predefined trajectory corresponds to a displacement of the cube 1 in two different directions in space. By way of non-limitative example, the particular predefined trajectory is a heart shape.

When an item of media content is being read, a new item of media content is read in response to a rotation of the cube 1 by an angle greater than 10° with respect to a second axis of rotation 6 passing through the cube 1 and being oriented horizontally according to a predefined direction 8 with respect to the face of the cube 1 oriented upwards, said rotation being followed, in a period of time less than or equal to 2 seconds, by a return of the cube 1 to its initial position. The new item of media content follows the item of media content being read within the list of items of media content being read. According to the embodiment, and by way of non-limitative example, a clockwise rotation 9 by an angle greater than 30° with respect to the second axis of rotation 6, said angle being held for a duration of less than 2 seconds, brings about the reading of a new item of media content following the item of media content being read within the list of items of media content being read. A rotation by an angle greater than 30° in the anti-clockwise direction 10 with respect to the second axis of rotation 6, said angle being held for a duration less than 2 seconds, brings about the reading of a new item of media content preceding the item of media content being read within the list of items of media content being read.

Each of the faces of the cube comprises an indication of the predefined direction 8, 11, 12, 13, 14, 15 in which, when a face is oriented upwards and a media item associated with the face is being read, the second axis of rotation 6 is oriented.

When an item of media content is being read, fast forwarding to the end of the item of content being read is initiated in response to a rotation of the cube 1 by an angle greater than 10° with respect to the second axis of rotation 6 passing through the cube 1 and oriented horizontally in the predefined direction 8 with respect to the face of the cube 1 oriented upwards, fast forwarding being triggered when the angle is held for a duration greater than 2 seconds and continued while the angle is held. When an item of media content is being read, rewinding to the beginning of the item of content being read is initiated in response to a rotation of the cube 1 by an angle greater than 10° with respect to the second axis of rotation 6 passing through the cube 1 and oriented horizontally in the predefined direction 8 with respect to the face of the cube 1 oriented upwards, rewinding being triggered when the angle is held for a duration greater than 2 seconds and continued while the angle is held. According to the embodiment, and by way of non-limitative example, rewinding is associated with the anti-clockwise direction of rotation and fast forwarding is associated with the clockwise direction of rotation 9.

Reading of the content is suspended in response to two successive taps given by a user on the cube 1, each tap being separated by a period of time of less than 2 seconds. Each of the taps corresponds to a displacement of the cube 1 by a distance of less than 2 centimetres and the duration of each of the taps is less than 1 second.

The track being read can be read again from the beginning in response to three successive taps of the cube 1 separated by a period of time of less than 2 seconds. The distance travelled during each tap is less than 2 centimetres and the duration of each of the taps is less than 1 second.

When the track being read has been read for a period of time of less than 3 seconds, reading of a track from an archive of files read during a session is initiated in response to three successive taps on the cube 1, these successive taps being separated by a period of time of less than 2 seconds. The distance travelled during each displacement being less than 2 centimetres and the duration of each of the taps is less than 1 second.

With reference to FIG. 2, in a second embodiment a portable object comprising one or more faces is described. The object can, for example, be a lamp or a speaker or a remote control. By way of non-limitative example, the portable object is a cube 1 comprising an energy storage unit, a module for detecting displacements of the cube 1 comprising a 9-axis accelerometer/gyrometer/compass (sold under the commercial name MPU-9150 by the commercial brand InvenSense), a loud-speaker of 3 Watts or more, an audio amplifier (sold under the commercial name Speaker pHAT by the brand Pimoroni) and a processing unit (sold under the commercial name RaspberryPi Nano Zero by the brand Raspberry Pi). The processing unit is programmed to increase the strength of a signal emitted by the cube 1 in response to the detection, by the detection module, of a clockwise rotation 5 of the cube 1 with respect to the first axis of rotation 4 passing through the cube 1 and oriented vertically. The cube 1 can be arranged to emit one or more types of signal simultaneously or successively. By way of non-limitative example, the strength of the signal emitted by the cube 1 is the volume of a sound signal. The strength of the volume emitted by the cube 1 is increased in response to a clockwise rotation 5 of the cube 1 with respect to the first axis of rotation 4 passing through the cube 1 and oriented vertically. The processing unit is programmed to reduce the strength of a signal emitted by the cube 1 in response to the detection, by the detection module, of an anti-clockwise rotation 3 of the cube 1 with respect to the first axis of rotation 4 passing through the cube 1 and oriented vertically.

The cube comprises a hard plastic shell, inside which the components are arranged. Soft plastic elements, for example made from rubber or silicone, comprising patterns are arranged, removably, on each of the faces of the cube 1. The patterns are, for example, pictograms making it possible, among other things, to indicate to the user the predefined direction 8, 11, 12, 13, 14, 15 in which, when a face is oriented upwards and a media item associated with the face is being read, the second axis of rotation 6 is oriented. An edge of the cube 1 measures approximately seven centimetres.

The processing unit is programmed to read an item of media content in response to the detection, by the detection module, of an agitation of the cube 1, the item of media content read being associated with a face of the cube 1 oriented upwards. The face of the cube 1 oriented upwards is parallel to a horizontal plane and the first axis of rotation is perpendicular to said face oriented upwards.

The cube 1 according to the invention comprises a transceiver arranged to be connected to a remote emitter of an external device. By way of non-limitative example, the transceiver emits and receives in the ultra high frequency (UHF) and super high frequency (SHF) ranges; it is in particular arranged according to network protocols of the Wi-Fi or Bluetooth type. The cube 1 comprises an electronic memory and the processing unit is programmed to read items of media content from items of data emitted by the remote emitter and/or from the electronic memory.

Of course, the invention is not limited to the examples which have just been described and numerous modifications can be made to these examples without departing from the scope of the invention.

Thus, in variants of the previously described embodiments that can be combined with one another:
- the signal emitted by the portable object 1 is an optical or vibration or olfactory or radio signal, and/or
- the signal emitted by the portable object 1 comprises a set of signals emitted by the portable object 1, and/or
- in the case where the portable object 1 only comprises a single face, the axis of rotation passing through the object 1 is perpendicular to the face of the object 1, and/or
- passage of the cube 1 from the activated state to the standby state is initiated in response to a rotation of the cube 1 by an angle greater than or equal to 360° with respect to the first axis of rotation 4, and/or
- the particular predefined trajectory corresponds to a displacement of the cube 1 in more than two directions in space, and/or
- the particular predefined trajectory is comprised in one plane, and/or
- the particular predefined trajectory is a geometric shape, and/or
- a list of items of media content can comprise a set of digital files and/or a set of audio and/or video tracks and/or a set of radio frequencies, and/or
- the item of media content read is associated with a face 7 of the cube 1 oriented upwards when the agitation is initiated, and/or
- each of the taps corresponds to a displacement of the cube 1 by a distance of less than 1 centimetre, and/or
- each of the taps corresponds to a displacement of the cube 1 by a distance of less than 0.5 centimetres, and/or
- the reading track read in response to three successive taps of the cube 1 is the last track added to the archive of files read, and/or
- the portable object 1 comprises a single face, and/or
- the portable object 1 according to the invention is a facetted portable multimedia object 1, and/or
- the portable object 1 according to the invention is a polyhedron, and/or
- the object 1 comprises one or more screens and/or a vibration source, and/or
- the screen is comprised on a face of the object, and/or
- the cube comprises several loud-speakers, and/or
- the pictograms are in relief.

In addition, the various features, forms, variants and embodiments of the invention can be combined with one another in various combinations, provided that they are not incompatible or exclusive of one another.

The invention claimed is:

1. A method for controlling a portable object, comprising:
increasing the strength of a signal emitted by the object in response to a clockwise, or respectively anti-clockwise, rotation of the object as a unit with respect to a first axis of rotation passing through the object;
reducing the strength of a signal emitted by the object in response to an anti-clockwise, or respectively clockwise, rotation of the object as a unit with respect to the first axis of rotation, said reduction of the strength of the signal being achieved through a reversal of the motion of the object which resulted in the increase of the signal; and
passage of the object from a standby state to an activated state is initiated in response to one of:
a rotation of the object by an angle greater than or equal to a first minimum angle value with respect to an axis of rotation passing through the object, and
an agitation of the object in a back and forth motion; and, once said object is in an activated state,
reading of an item of media content by the object is initiated in response to an agitation of the object different from any agitation performed for passage of the object from a standby state to an activated state, the item of media content read being associated with a face of the object oriented upwards.

2. The method according to claim 1, characterized in that the signal emitted by the object is:
a sound signal, or
an optical signal, or
a vibration signal, or
an olfactory signal, or
a radio signal.

3. The according to claim 1, characterized in that passage of the object from an activated state to a standby state is initiated in response to a rotation of the object by an angle greater than or equal to a second minimum angle value with respect to a second axis of rotation passing through the object.

4. The method according to claim 1, characterized in that an item of media content being read is indexed in a dedicated folder in response to a displacement of the object according to a particular predefined trajectory.

5. The method according to claim 1, characterized in that a new item of media content is read in response to a rotation of the object by an angle greater than a third minimum angle value with respect to a third axis of rotation passing through the object, said rotation being followed, in a period of time shorter than or equal to a first maximum duration, by a return of the object to its initial position, the new item of media content follows the item of media content being read within a list of items of media content; said list of items of media content being associated with the face of the object oriented upwards when the object is in its initial position.

6. The method according to claim 1, characterized in that it comprises fast forwarding to the end of the item of content being read, and rewinding to the beginning of the item of content being read, in response to a rotation of the object by an angle greater than a fourth minimum angle value with respect to a fourth axis of rotation passing through the object, fast forwarding and rewinding being triggered when the angle is held for a duration greater than a first minimum duration and continued while the angle is held, the direction of rotation for rewinding being opposite to that for fast forwarding.

7. The method according to claim 6, characterized in that the face of the object oriented upwards is parallel to a horizontal plane, the first axis of rotation being perpendicular to said face oriented upwards, the second axis of rotation being identical to the first axis of rotation, and the fourth axis of rotation is identical to the third axis of rotation, perpendicular to the first axis of rotation and oriented in a predefined direction with respect to the face of the object oriented upwards.

8. The method according to claim 1, characterized in that reading of the content is suspended in response to two successive displacements of the object separated by a period of time shorter than a second maximum duration; a distance travelled during each displacement being shorter than a first maximum distance and a duration of each of the successive displacements being shorter than a third maximum duration.

9. The method according to claim 1, characterized in that the track being read is read again from the beginning in response to three successive displacements of the object separated by a period of time shorter than a fourth maximum duration; a distance travelled during each displacement being shorter than a second maximum distance and a duration of each of the successive displacements being less than the third maximum duration.

10. The method according to claim 5, characterized in that, when the track being read has been read for a period of time shorter than a fifth maximum duration, reading of a track from an archive comprising the files read during a session is initiated in response to three successive displacements of the object, these successive displacements being separated by a period of time shorter than the second maximum duration; a distance travelled during each displacement being shorter than the second maximum distance and a duration of each of the successive displacements being shorter than the third maximum duration.

11. A portable object having one or more faces, said object comprising:
an energy storage unit;
a module for detecting displacements of the object comprising an accelerometer and a gyrometer;
a loud-speaker and/or a screen and/or a vibration source; and
a processing unit configured and/or programmed to:
increase the strength of a signal emitted by the object in response to the detection, by the detection module, of a clockwise, or respectively anti-clockwise, rotation of the object as a unit with respect to a first axis of rotation passing through the object,
reduce the strength of a signal emitted by the object in response to the detection, by the detection module, of an anti-clockwise, or respectively clockwise, rotation of the object as a unit with respect to the first axis of rotation, such reduction of the strength of the signal being achieved by a reverse motion of the object compared to the motion resulting in the increase in strength of the signal,
initiate passage of the object from a standby state to an activated state in response to one of:
a rotation of the object by an angle greater than or equal to a first minimum angle value with respect to an axis of rotation passing through the object, and
an agitation of the object in a back and forth motion, and once said object is in an activated state,
read an item of media content in response to the detection, by the detection module, of an agitation of the object different from any agitation performed for passage of the object from a standby state to an activated state, the media content read being associated with a face of the object oriented upwards.

12. The object according to claim 11, characterized in that the face of the object oriented upwards is parallel to a horizontal plane, and in that the first axis of rotation is perpendicular to said face oriented upwards.

13. The object according to claim 11, comprising:
a transceiver arranged to be connected to a remote emitter of an external device,
an electronic memory; and
the processing unit being configured and/or programmed to read items of media content from data emitted by the remote emitter and/or from the electronic memory.

14. The object of claim 11, wherein at least one of the first minimum angle value and a second minimum angle with respect to a second axis of rotation passing through the object is greater than or equal to 360°.

15. The object of claim 11, wherein at least one of the first maximum duration is less than or equal to two seconds, and the second minimum duration is greater or equal to two seconds.

16. The object of claim 11, wherein said object is a cube having a hard plastic shell inside which the components are arranged.

17. A portable object having one or more faces, said object comprising:
an energy storage unit;
a module for detecting displacements of the object comprising an accelerometer and a gyrometer;
a loud-speaker and/or a screen and/or a vibration source; and
a processing unit configured and/or programmed to:
increase the strength of a signal emitted by the object in response to the detection, by the detection module, of a clockwise, or respectively anti-clockwise, rotation of the object as a unit with respect to a first axis of rotation passing through the object,
reduce the strength of a signal emitted by the object in response to the detection, by the detection module, of an anti-clockwise, or respectively clockwise, rotation of the object as a unit with respect to the first axis of rotation, such reduction of the strength of the signal being achieved by a reverse motion of the object compared to the motion resulting in the increase in strength of the signal,
initiate passage of the object from a standby state to an activated state in response to one of:
a rotation of the object by an angle greater than or equal to a first minimum angle value with respect to an axis of rotation passing through the object, and
an agitation of the object in a back and forth motion; and once said object is in an activated state,
the face of the object oriented upwards is parallel to a horizontal plane, and in that the first axis of rotation is perpendicular to said face oriented upwards, and
read an item of media content in response to the detection, by the detection module, of an agitation of the object different from any agitation performed for passage of the object from a standby state to an activated state, the media content read being associated with a face of the object oriented upwards.

18. The object of claim 11, wherein said object is a cube including soft resilient elements having patterns removably arranged on faces of the cube.

19. The method according to claim 1, characterized in that the media content comprises a set of items of content.

20. The method according to claim 1, characterized in that the media content comprises a set of items of content and, after the reading has been initiated, the items of media content are read successively or randomly.

\* \* \* \* \*